(12) United States Patent
Bosman et al.

(10) Patent No.: US 11,504,217 B2
(45) Date of Patent: Nov. 22, 2022

(54) VIBRATION CANCELLATION FOR PERSONAL CARE DEVICE

(71) Applicant: KONINKLIJKE PHILIPS N.V., Eindhoven (NL)

(72) Inventors: Franciscus Jozef Bosman, Drachten (NL); Pieter Johannes Bax, Drachten (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/610,939

(22) PCT Filed: Nov. 5, 2018

(86) PCT No.: PCT/EP2018/062275
§ 371 (c)(1),
(2) Date: Nov. 5, 2019

(87) PCT Pub. No.: WO2018/206806
PCT Pub. Date: Nov. 15, 2018

(65) Prior Publication Data
US 2020/0069404 A1 Mar. 5, 2020

Related U.S. Application Data

(60) Provisional application No. 62/503,497, filed on May 9, 2017.

(51) Int. Cl.
*A61C 17/22* (2006.01)
*A61C 17/34* (2006.01)
(Continued)

(52) U.S. Cl.
CPC ........ *A61C 17/3481* (2013.01); *A61C 17/225* (2013.01); *A61C 17/34* (2013.01); *F16F 15/04* (2013.01); *H02K 5/24* (2013.01); *H02K 33/02* (2013.01)

(58) Field of Classification Search
CPC .......... H02K 5/24; H02K 33/02; H02K 33/12; H02K 33/18; A61C 17/34; A61C 17/3418; A61C 17/225; F16F 15/04
USPC .................................................. 310/114–116
See application file for complete search history.

(56) References Cited

U.S. PATENT DOCUMENTS

| | | |
|---|---|---|
| 4,447,793 A | 5/1984 | Gray |
| 5,068,566 A | 11/1991 | Culp |
| (Continued) | | |

FOREIGN PATENT DOCUMENTS

| | | |
|---|---|---|
| CA | 2064529 C | 9/1998 |
| CN | 1100238 A | 3/1995 |
| (Continued) | | |

OTHER PUBLICATIONS

International Search Report and Written Opinion, International Application No. PCT/EP2018/062275, dated Aug. 13, 2018.

*Primary Examiner* — Eric Johnson (57) ABSTRACT

A personal care cleaning device (10) including a housing (12), a resonant drive actuator (20), which includes a rotor (24) having a first moment of inertia ($J_r$) and a stator (22) having a second moment of inertia ($J_s$); a first plurality of leaf spring elements (60) having a first spring constant ($k_{rh}$), each leaf spring element of the first plurality of leaf spring elements (60) being connected the housing (12) and to the rotor (24) such that each leaf spring element of the first plurality of leaf springs elements (60) extends radially from the rotor (24) to the housing (12), each leaf spring element of the second plurality of leaf spring elements (62) being connected to the housing (12) and engaging with the stator (22), wherein the ratio of the first ($k_{rh}$) and second ($k_{sh}$) spring constants is sufficiently similar to the ratio of the first (Continued)

($J_r$) and second moments ($J_s$) of inertia such that there is substantially no resulting torque transmitted to the housing (12) during operation.

13 Claims, 7 Drawing Sheets

(51) Int. Cl.
  *F16F 15/04* (2006.01)
  *H02K 5/24* (2006.01)
  *H02K 33/02* (2006.01)

(56) References Cited

U.S. PATENT DOCUMENTS

| | | |
|---|---|---|
| 7,288,863 B2 | 10/2007 | Kraus |
| 7,554,225 B2 * | 6/2009 | Kraus ............... H02K 33/18 310/15 |
| 2002/0108251 A1 * | 8/2002 | Brum ................. B26B 19/28 30/45 |
| 2008/0093950 A1 | 4/2008 | Cros et al. |
| 2009/0070948 A1 * | 3/2009 | Bax ................ A61C 17/3472 15/167.1 |
| 2010/0132139 A1 | 6/2010 | Jungnickel |
| 2013/0207575 A1 * | 8/2013 | Bax .................... H02K 33/18 318/128 |
| 2014/0259473 A1 | 9/2014 | Bax et al. |
| 2017/0100224 A1 | 4/2017 | Wills et al. |

FOREIGN PATENT DOCUMENTS

| | | | |
|---|---|---|---|
| CN | 102111032 A | * 6/2011 | ............. H02K 33/00 |
| GB | 2422251 A | * 7/2006 | ............. H02K 33/00 |
| JP | 2003319616 A | 11/2003 | |
| KR | 200339703 Y1 | 1/2004 | |

* cited by examiner

180# VIBRATION CANCELLATION FOR PERSONAL CARE DEVICE

This application is the U.S. National Phase application under 35 U.S.C. § 371 of International Application No. PCT/EP2018/062275, filed on 5 Nov. 2018, which claims the benefit of U.S. Provision Application No. 62/503,497, filed 5 Sep. 2017. These applications are hereby incorporated by reference herein.

FIELD OF THE INVENTION

The present disclosure is directed generally to a personal care device including a vibration cancelling suspension.

BACKGROUND

Electric personal care cleaning devices, including power toothbrushes, shavers, and similar devices, have a motor, such as a mechanical, electromechanical, magnetic motor, that engages a drive train in order to drive a cleaning mechanism in an oscillating, reciprocating, or other pattern. As a result of the motion of the drive train, the handle of the personal care device may vibrate in a manner unpleasant to a user.

Various methods have been employed to reduce the vibration experienced at the handle of the device. One such method is to add additional inertia, in the form of an attached weight, to the stator or handle of the motor. While this additional weight effectively reduces the vibration experienced at the handle, it also undesirably extends the length, weight, and cost of the device.

Furthermore, when the shaft is connected to the housing using traditional bearings, such as slide bearings, the motor must be powerful enough to overcome the friction induced by those bearings. A more powerful motor requires additional magnets and windings, but results in a stiffer motor with a higher resonance frequency. To lower the resonance frequency, inertia, in the form of a weight may be added to the shaft, but this extends the length and weight of the device, and the additional magnets and windings increase the cost of the device.

Accordingly, there is a continued need for personal care device including a vibration cancellation system that is inexpensive, compact, and relatively easy to produce.

SUMMARY OF THE INVENTION

The present disclosure is directed to a personal care cleaning device including an inventive vibration cancellation suspension. Applied to a powered personal care device such as an electric toothbrush or shaver, the inventive systems provide a personal care device with reduced handle vibration. The inventive vibration cancellation system features a first plurality of leaf springs, connecting the rotor and the housing, and a second plurality of leaf springs connecting the stator to the housing. The first and second plurality of leaf springs form a bearing for the rotor and effectively cancel vibration communicated to the handle of the personal care device.

Generally in one aspect, a personal care device includes a housing dimensioned to be grasped be a user; an electric motor, comprising: a rotor having a first moment of inertia and disposed within and extending through a stator; said stator having a second moment of inertia and disposed within said housing; a first plurality of leaf spring elements having a first spring constant, each leaf spring element of the first plurality of leaf spring elements being connected the housing and to the rotor such that each leaf spring element of the first plurality of leaf springs elements extends radially from the rotor to the housing and is configured to elastically deform to permit the rotor to rotate with respect to the housing; and a second plurality of leaf spring elements having a second spring constant, each leaf spring element of the second plurality of leaf spring elements being connected to the housing and to the stator, each leaf spring element extending axially along at least a portion of the length of the stator and being configured to elastically deform to permit the stator to rotate with respect to the housing; wherein a ratio of the first and second spring constants is sufficiently similar to a ratio of the first and second moments of inertia that there is substantially no resulting torque transmitted to the housing during operation.

According to an embodiment, a first portion of the rotor extends beyond a first end of the stator and a second portion of the rotor extends beyond a second end the stator, wherein a first set of the first plurality of leaf spring elements are connected to the rotor at a point along the first portion of the rotor.

According to an embodiment, a second set of the first plurality of leaf spring elements are connected to the rotor at a point along the second portion of the rotor.

According to an embodiment, the personal care device further includes a ball bearing connecting the rotor to the housing, wherein the ball bearing engages with the rotor at a point along the second portion of the rotor and permits the rotor to rotate with respect to the housing.

According to an embodiment, during operation, the rotor is configured to rotate with respect to the housing in a first angular direction, wherein the stator is configured to rotate with respect to the housing in a second angular direction, wherein the first angular direction is opposite the second angular direction.

According to an embodiment, the stator comprises: a can defining an interior surface; a plurality of magnets disposed upon the interior surface of the can, wherein the plurality of magnets are grouped into a plurality of groups, wherein each leaf spring leaf of the second plurality of leaf spring leafs extends into the can through a portion of the interior surface between adjacent groups of the plurality of groups.

According to an embodiment, each group comprises a single magnet with a North-South magnetization pattern.

According to an embodiment, the housing defines a ring disposed circumferentially about the stator, wherein the first plurality of leaf spring elements are connected to the ring and the second plurality of leaf spring elements are connected to the ring.

According to an embodiment, the personal care device further includes a set of terminals configured to electrically engage with the rotor, wherein each terminal of the set of terminals extends axially along the interior of the can, between at least one pair of adjacent grouped magnets of the plurality of magnets.

According to an embodiment, the rotor comprises an iron shaft.

According to another aspect, a vibration cancellation suspension includes: a first plurality of leaf spring elements being connected to a rotor of a resonant drive actuator and to a housing, wherein the first plurality of leaf spring elements retain the rotor centrally within a stator and permit, through elastic deformation of the first plurality of leaf spring elements, the rotor to rotate with respect to the housing; a second plurality of leaf spring elements extending axially along at least a portion of the length of a stator wherein the second plurality of leaf spring elements connects to the housing and engages with the stator to permit, through elastic deformation of the second plurality of leaf spring elements, the stator to rotate with respect to the housing; wherein the first plurality of a leaf spring elements and second plurality of leaf spring elements are configured to flexibly suspend the rotor and the stator with respect to the housing such that the rotor and the stator rotate in opposite angular directions, with respect to each other, during operation.

According to an embodiment, a first portion of the rotor extends beyond a first end of the stator and a second portion of the rotor extends beyond a second end the stator, wherein a first set of the first plurality of leaf spring elements are connected to the rotor at a point along the first portion of the rotor.

According to an embodiment, a second set of the first plurality of leaf spring elements are connected to the rotor at a point along the second portion of the rotor.

According to an embodiment the vibration cancellation suspension further includes a ball bearing connecting the rotor to the housing, wherein the ball bearing engages with the rotor at a point along the second portion of the rotor and permits the rotor to rotate with respect to the housing.

According to an embodiment, each leaf spring of the second plurality of leaf spring leafs extends into the can through a respective portion of an interior surface of the can between adjacent groups of magnets.

It should be appreciated that all combinations of the foregoing concepts and additional concepts discussed in greater detail below (assuming such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a device for a drive train assembly for an electric personal care device. More generally, Applicant has recognized and appreciated that it would be beneficial to provide a drive train leaf spring assembly that reduces the vibration transmitted from the motor to the handle of the electric personal care device. Accordingly, the systems described or otherwise envisioned herein provide a personal care device, such as an electric toothbrush or shaver, with a drive train leaf spring assembly comprising at least one leaf spring that extends along the length of the stator, connecting the stator to the housing, and at least one other leaf spring connecting the rotor to the housing.

A particular goal of utilization of the embodiments and implementations herein is to provide a drive train assembly having reduced handle vibration for an oral cleaning device such as, e.g., a Philips Sonicare toothbrush or a male grooming device such as a Philips Norelco shaver (manufactured by Koninklijke Philips Electronics, N.V.), although the assembly may be utilized with many other personal care devices.

Figure 1:
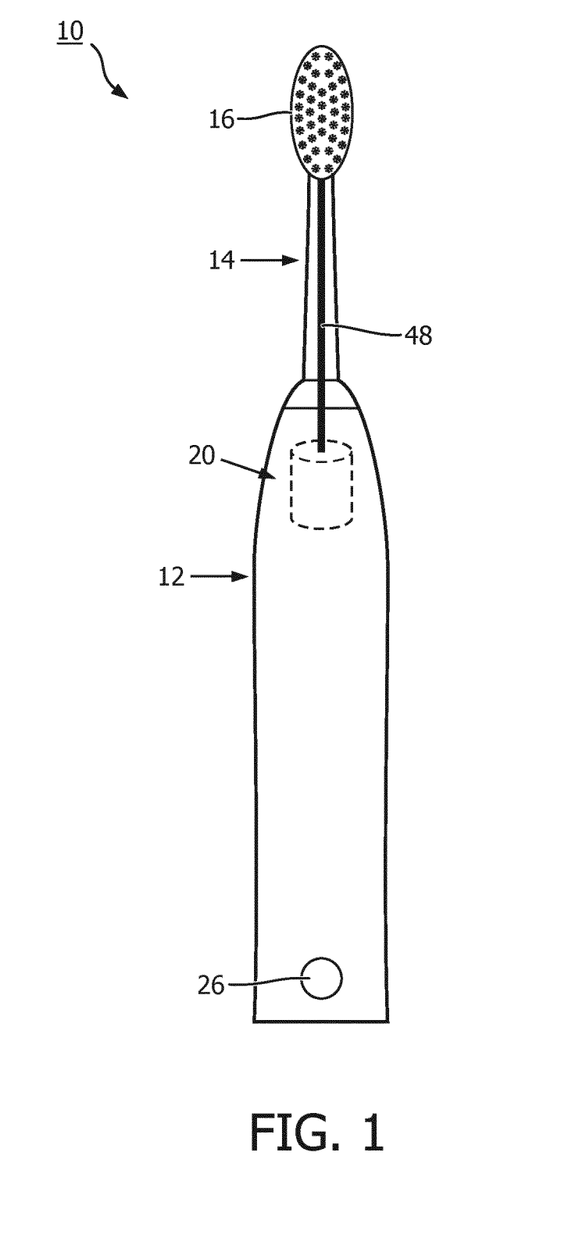
FIG. 1 is a schematic representation of a personal care cleaning device, in accordance with an embodiment.

Referring to FIG. 1, in one embodiment, a personal care cleaning device 10 is provided that includes a body portion with a housing 12 and a cleaning head member 14 mounted on the body portion. Cleaning head member 14 includes at its end remote from the body portion a brush head, or other type of grooming mechanism 16.

Cleaning head member 14 is mounted so as to be able to move relative to the housing 12. The movement can be any of a variety of different movements, including vibrations or rotation, among others. According to one embodiment, cleaning head member 14 is mounted to the body portion so as to be able to vibrate (i.e. reciprocate) relative to housing 12. The head member 14 can be fixedly mounted onto housing 12, or it may alternatively be detachably mounted so that cleaning head member 14 can be replaced with a new one when the cleaning components of the device are worn out and require replacement.

The body portion contains a resonant drive actuator 20 incorporating a shaft 48 for generating and transmitting movements from the resonant drive actuator 20 to cleaning head member 14.

In one embodiment the power supply (not shown) comprises one or more rechargeable batteries, not shown, which can, for example, be electrically charged in a charging holder in which personal care cleaning device 10 is placed when not in use.

The body portion is further provided with a user input 26 to activate and de-activate resonant drive actuator 20. The user input 26 allows a user to operate the personal care cleaning device 10, such as turning the device on and off. The user input 26 may, for example, be a button, touch screen, or switch.

Figure 2A:
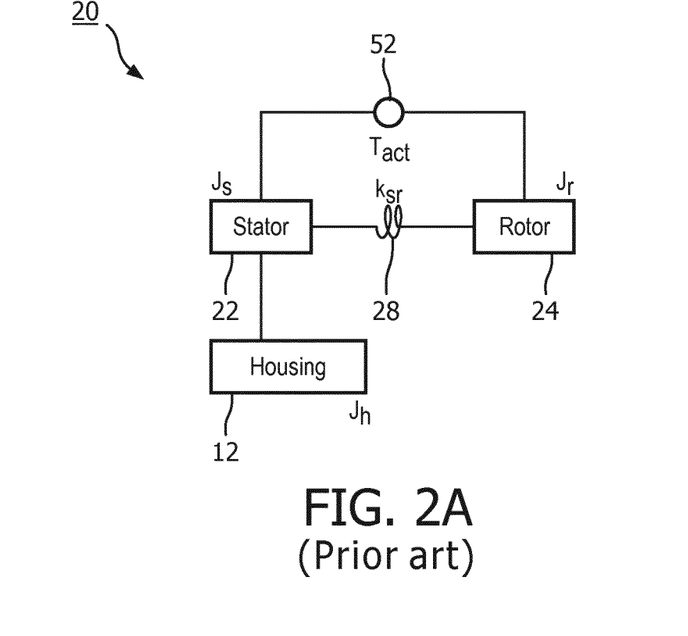
FIG. 2A is a schematic representation of the various parts of a personal care cleaning device and the electrical and mechanical connections therebetween, in accordance with the prior art.

FIG. 2A models the various forces at play in such a system. In the example shown, a stator 22 and rotor 24 of a resonant drive actuator 20 of the prior art, which are disposed within a housing 12 (e.g., a handle). Stator 22 is rigidly connected to housing 12. Stator 22 and rotor 24 generate torque 52 ($T_{act}$), driving rotor 24 in a reciprocating motion. As a result of torque 52, stator 22 has a mass moment of inertia $J_s$ while rotor 24 has a mass moment of inertia $J_r$. The forces generated by stator 22 and rotor 24 may be modeled as spring 28, designated $k_{sr}$, which is the resilient part of the mass spring system of the resonant drive actuator 20. Housing 12 has a mass moment of inertia $J_h$, which includes the mass of the electronics and the battery. Similarly, rotor mass moment of inertia $J_r$ includes the mass of cleaning head member 14.

Figure 2B:
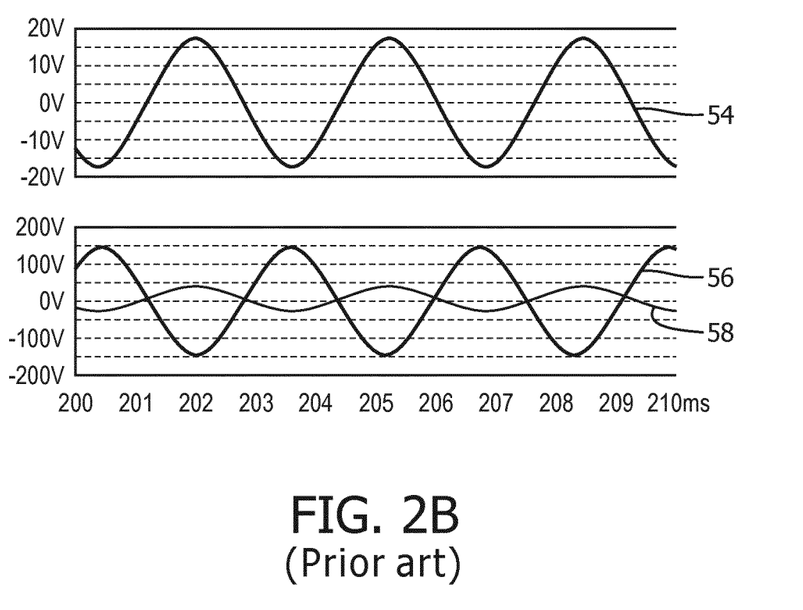
FIG. 2B is a chart depicting the vibrations experienced by different members of the personal care cleaning device of FIG. 2A, in accordance with an embodiment of the prior art.

Because stator 22 is rigidly connected to the housing 12, stator 22 will be stationary with respect to housing 12 during operation, and the torque generated by stator 22 and rotor 24 will be communicated to housing 12, creating an unpleasant vibration in the handle. FIG. 2B depicts the vibration of stator 22, rotor 24, and housing 12 in a system of the prior art. The vibration of rotor 24 is shown at line 56, while the movement of stator 22, designated at line 58, remains relatively quiet. Housing 12, however, experiences a significant vibration, which is shown at line 54. The vibration of rotor 24, with its relatively large amplitude, is 180° out of phase with respect to the vibration of housing 12, while the small vibration of stator 22 is in-phase with the vibration of housing 12.

Figure 3A:
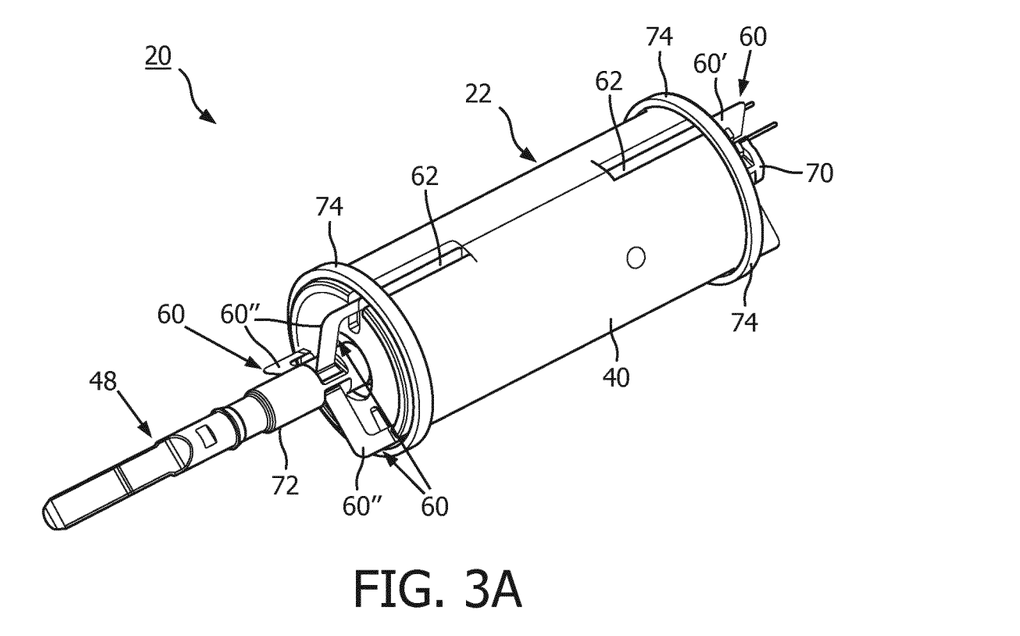
FIG. 3A is a schematic of a personal care cleaning device and a vibration cancelling suspension, in accordance with an embodiment.
Figure 3B:
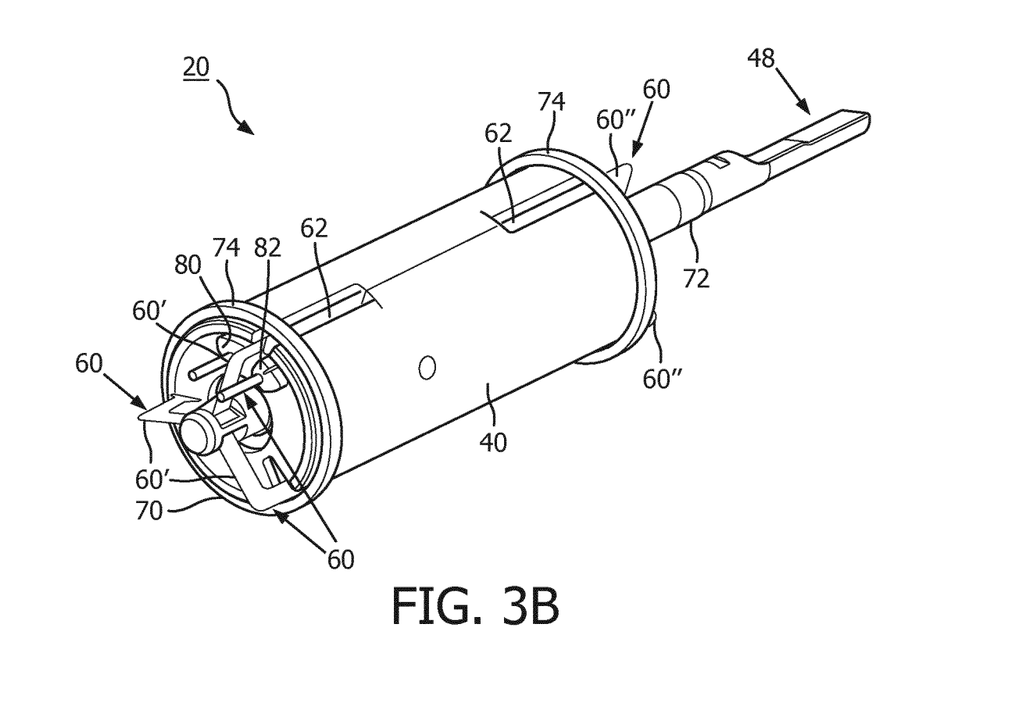
FIG. 3B is a schematic of a personal care cleaning device and a vibration cancelling suspension, in accordance with an embodiment.

As shown in FIGS. 3A and 3B, the device of the present invention may mitigate the vibration transmitted to the handle in a personal care device having a resonant drive actuator 20. Stator 22 may, for example, comprise a can 40 and a plurality of magnets 44 disposed therein (see FIGS. 6 and 7). As will be discussed further below, in an embodiment, stator 22 may employ six magnets 44, three of which produce a North pole and three of which produce a South pole. Rotor 24 may be disposed within and extend through stator 22. Rotor 24 may be comprised of a shaft 48 and a plurality of windings 50 set about shaft 48. In the embodiment shown in FIGS. 6 and 7, windings 50 may be configured such that each winding is set about 120 electrical degree apart from each other winding; however, in other embodiments, other numbers of windings and magnets may be used. When energized with an electric potential, windings 50 will magnetically engage with magnets 44 to generate reciprocating rotation which is translated to shaft 48 and, consequently, to grooming mechanism 16. Shaft 48, in an embodiment, may be comprised of a ferrous material, such as iron, although one of ordinary skill in the art will appreciate that other materials may be suitable for forming shaft 48.

As shown in FIGS. 3A and 3B, an embodiment may include a vibration cancellation suspension system comprising a first plurality of leaf spring elements 60 and a second plurality of leaf spring elements 62, which largely cancels or otherwise reduces the vibration experienced by housing 12. The first and second plurality of leaf spring elements 60 and 62 of vibration cancelling suspension may engage with rotor 24 and stator 22, respectively, such that the position of stator 22 and rotor 24 is fixed—i.e., the first and second plurality of leaf spring elements 60 and 62 retain both parts in a fixed configuration. The first plurality of leaf spring elements 60 allow for angular reciprocating motion of rotor 24, with respect to housing 12, by elastic deformation (i.e., bending). The second plurality of leaf spring elements 62 allows for angular reciprocating motion of stator 22 with respect to housing, also by elastic deformation. The first and second plurality of leaf spring elements 60 and 62, combined with the reciprocating motion, serve as a bearing—i.e., positioning the axis of rotation of rotor 24 in a fixed, centered position with respect to stator 22—resulting in a motor without energy loss.

Figure 4A:
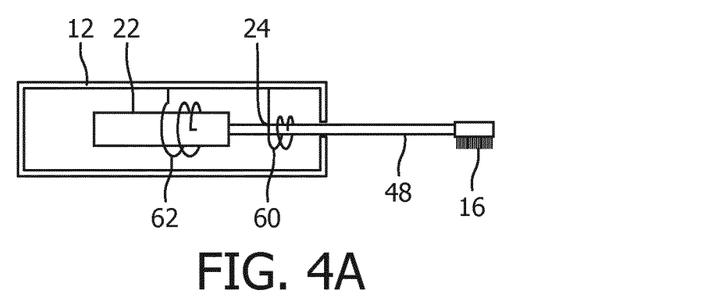
FIG. 4A is a schematic representation of the various parts of a personal care cleaning device having a vibration cancelling suspension and the mechanical connections therebetween, in accordance with an embodiment.
Figure 4B:
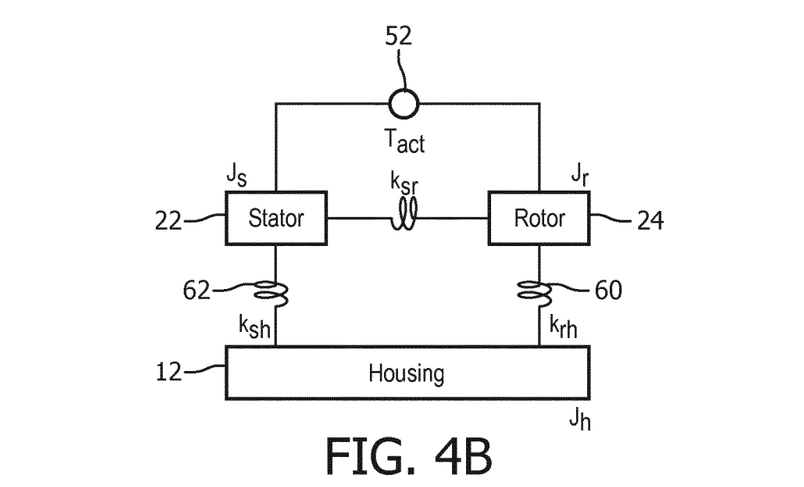
FIG. 4B is a schematic representation of the various parts of an oral cleaning device having a vibration cancelling suspension and the electrical and mechanical connections therebetween, in accordance with an embodiment.

FIGS. 4A and 4B show schematic representations of the leaf spring connections between the various elements of personal care cleaning device. As shown, stator 22 is connected via the second plurality of leaf spring elements 62 to housing 12, while rotor 24 is connected via the first plurality of leaf spring elements 60 to housing 12. As a result, the reaction torque from rotor 24 is compensated by a second reaction torque from the stator 22. In other words, because stator 22 is not rigidly attached to housing 12, and instead may rotate with respect to housing 12 (at least to the degree permitted by the elastic deformation of the second plurality of leaf spring elements 62), stator 22 and rotor 24 move during operation in opposite angular directions with respect to each other and housing 12. The opposite motion of stator 22 substantially cancels the vibration experience by housing 12. The spring constants $k_{rh}$ and $k_{sh}$ of the first and second plurality of leaf spring elements 62 and 60, respectively, are selected to have the same ratio as the mass moments of inertia of the stator and rotor, respectively. This results in the net torque on the housing 12 being substantially zero.

The forces between the various elements are modeled in FIG. 4B. Again, the second plurality of leaf spring elements 62 connect stator 22 and housing 12, while first plurality of leaf spring elements 60 connect rotor 24 and housing 12. $J_s$, $J_r$ and $J_h$ represent the mass moments of inertia for the stator, rotor and housing, respectively, while $k_{sh}$, and $k_{rh}$ represent the spring constants of the first and second plurality of leaf spring elements 60 and 62, respectively. Because of this configuration, rotor 24 and stator 22 have opposing movements/oscillations; their respective torques therefore oppose each other relative to any action on the housing. In order to produce a net torque to the housing of approximately zero, such that there is little, if any, vibration of the handle, the ratio of the spring constants:

$$\frac{k_{rh}}{k_{sh}}$$

must approximately equal the ratio of the mass moments of inertia:

$$\frac{J_r}{J_s}$$

Figure 4C:
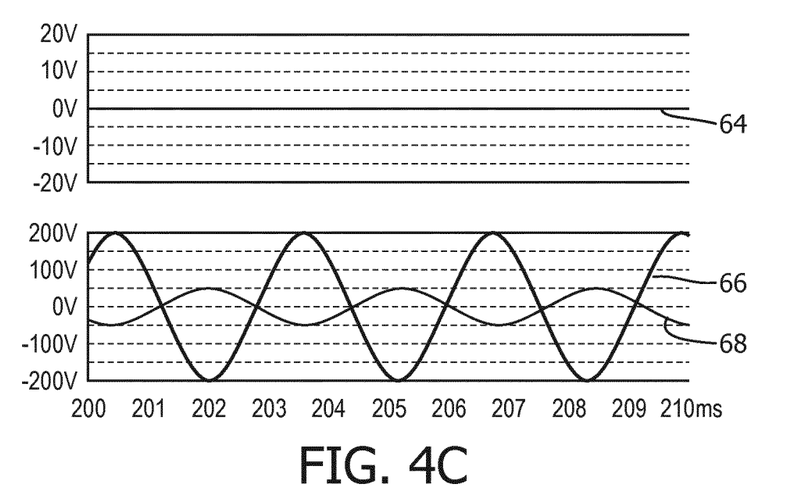
FIG. 4C is a chart depicting the vibrations experienced by different members of the personal care cleaning device of FIG. 4A, in accordance with an embodiment.

When the ratio of the spring constants equals the ratio of the mass moments of inertia, vibration of the handle is substantially zero, since the net torque applied to the handle will be zero. This is illustrated in FIG. 4C, which shows rotor 24 movement represented by line 66 and stator 22 movement represented by line 68, opposite relative to the rotor 24. The result is a lack of vibration to the housing 12, is shown by line 64 (in the ideal case, line 64 would be flat).

Returning to FIGS. 3A and 3B, the first plurality of leaf spring elements 60 may extend radially from rotor 24 and connect rotor 24 to housing 12. As shown, the first plurality of leaf spring elements 60 are divided into two sets of leaf springs elements, a first set 60' located at the end farthest from the shaft 48 and a second set 60" located nearest shaft 48. Because rotor 24 extends through stator 22, a first portion 70 of rotor 24 extends beyond the rear of stator 22, and a second portion 72 of rotor 24 extends beyond a front end of stator 22. The first set 60' of the first plurality of leaf spring elements 60 is connected to the first portion 70 of rotor 24 at the back of stator 22, while the second set 60" of the first plurality of leaf spring elements 60 is connected to the second portion 72 of rotor 24 at the front of stator 22. In this configuration, both sets (60', 60") of the first plurality of leaf spring elements 60 center the rotor 24 with respect to stator 22, and permit a degree of rotation of rotor 24 with respect to stator 22 and housing 12, thus both sets (60', 60") of the first plurality of leaf spring elements 60, together, form a bearing for rotor 24.

The second plurality of leaf spring elements 62 may run lengthwise along stator 22, parallel to shaft 48. Again, the second plurality of leaf spring elements 62 may connect housing 12 to stator 22. As will be discussed further below, the second plurality of leaf spring elements 62 may extend between each set of magnets 44. Each leaf spring element of the second plurality of leaf spring elements 62 is further connected at an end to stator 22.

As shown in FIGS. 3A-3B, rings 74, may be disposed circumferentially about each end of stator 22. Rings 74 are affixed to the housing 12 and connect to the first and second plurality of leaf spring elements 60 and 62. Thus, each of leaf springs may be shaped to attach to ring 74. Similarly, leaf spring elements 62 may extend from ring 74 into and along the length of can 40.

While the first and second plurality of leaf spring elements 60 and 62 may be attached to housing 12 via rings 74 in one embodiment, in other embodiments the first and second plurality of leaf spring elements 60 and 62 may attach to housing 12 in different ways. For example, the first plurality of leaf spring elements 60 may be generally straight and extend straight radially outward from rotor 24 to contact an inner surface of housing 12. Furthermore, it is not necessary that the first and second plurality of leaf spring elements 60 and 62 attach to the same portion of housing 12, but may instead be attached at different points along the housing 12 as may be advantageous for manufacturing and construction of a personal care device.

In an embodiment, each set (60', 60") of the first plurality of leaf spring elements 60 may include three leaf springs, arranged approximately 120 degrees apart from each other; however, other numbers of leaf springs with different spacing may be used in other embodiments. Similarly, although three leaf spring elements of the second plurality of leaf spring elements 62 are shown in FIGS. 3A-3B (and 5A-5B) a different number may be used. One of ordinary skill in the art will appreciate that the spring constants of each leaf spring may vary according to the number of leaf springs used.

Leaf springs of both the first and second plurality of leaf spring elements 60 and 62 may be comprised of plastic, metal, or any resilient material suitable for connecting housing 12 to rotor 24 and stator 22 with a spring constant sufficient to render housing 12 substantially stationary during operation.

Figure 5A:
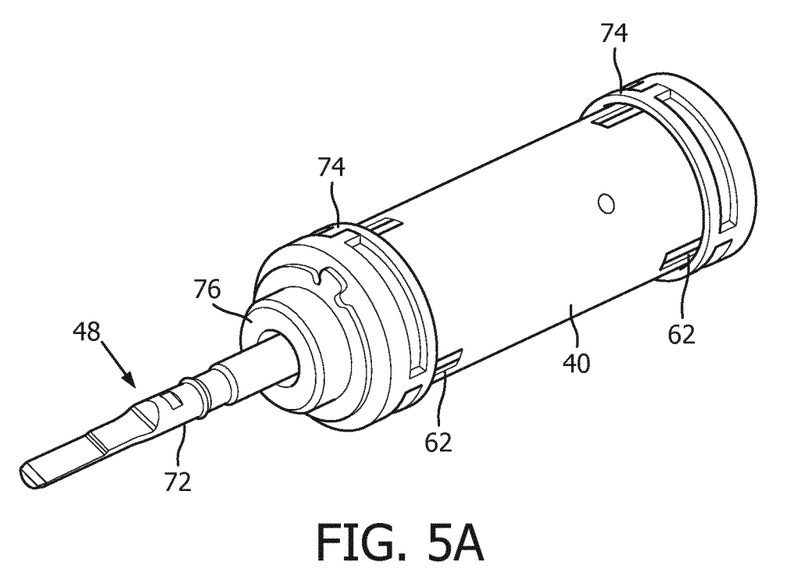
FIG. 5A is a schematic of a personal care cleaning device and a vibration cancelling suspension, in accordance with an embodiment.
Figure 5B:
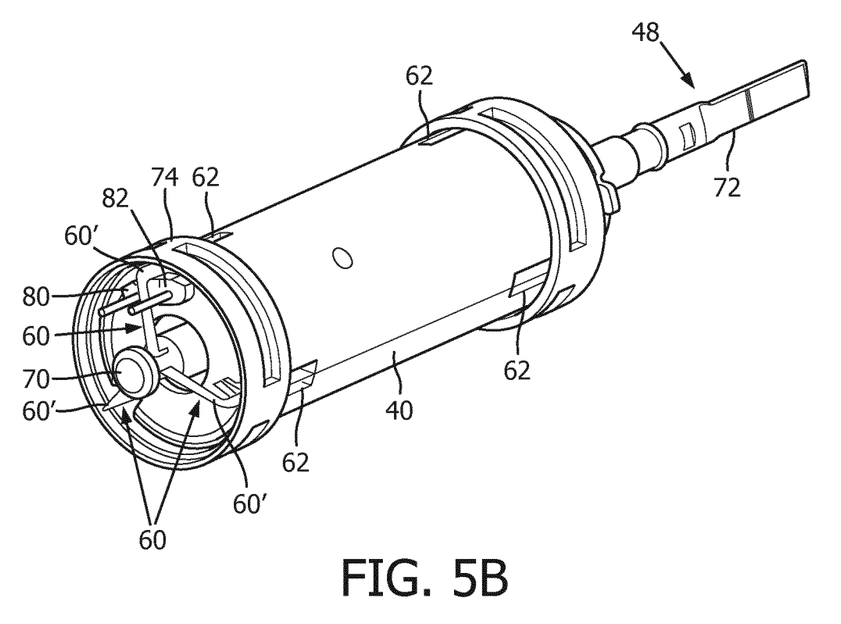
FIG. 5B is a schematic of a personal care cleaning device and a vibration cancelling suspension, in accordance with an embodiment.

In an embodiment with a removable cleaning head, the loads of changing cleaning head member 14 may be too great for leaf springs and could result in breakage, or, otherwise, deformation of leaf springs. Thus, in an alternate embodiment, as shown in FIGS. 5A and 5B, only one set of leaf spring elements of the first plurality of leaf springs elements 60 may be used, attached to first portion 70 of rotor 24 at the rear end of the stator. The other end of rotor 24 may be connected by a bearing 76 to housing 12 to compensate for the additional forces imposed on personal care cleaning device 10 while cleaning head member 14 is being changed. Bearing 76 may be any bearing, such as a ball bearing, suitable for supporting and permitting rotation of rotor 24, while withstanding the loads of brushing and changing of a brush head 16. Accordingly, bearing 76 may be used instead of leaf spring elements 60" at the front end of stator 22.

In this embodiment, the first plurality of leaf spring elements 60 must be thicker, and have higher spring stiffness, when only one set of the first plurality of leaf spring elements 60 is employed. By contrast when two sets (60', 60") of the first plurality of leaf spring elements 60 are employed (i.e. at the front and back of the resonant actuator) thinner and less stiff springs may be used.

Figure 6:
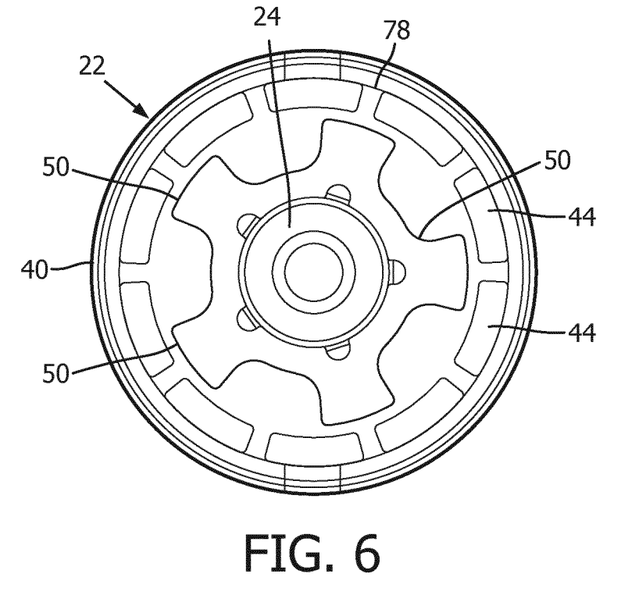
FIG. 6 is cross-section view of an electric motor of a personal care cleaning device, in accordance with an embodiment.

Turning to FIG. 6, stator 22 includes magnets 44 disposed along an interior surface of can 40. These magnets electromagnetically engage with the windings 50 of rotor 24 during operation to induce the reciprocating motion of stator 22 and rotor 24. A five-pole configuration shown in FIG. 6 includes five windings disposed about the rotor 24, which engage with five sets of magnets, each set including a North and a South pole. Because a set of five North-South magnet pairs is used at the front of the resonant drive actuator and another set of five North-South magnet pairs is used at the rear of the resonant drive actuator, this embodiment requires a total of twenty magnets. Because so many magnets are required, there is little room for the second plurality of leaf spring elements 62 to extend into stator 22.

Figure 7:
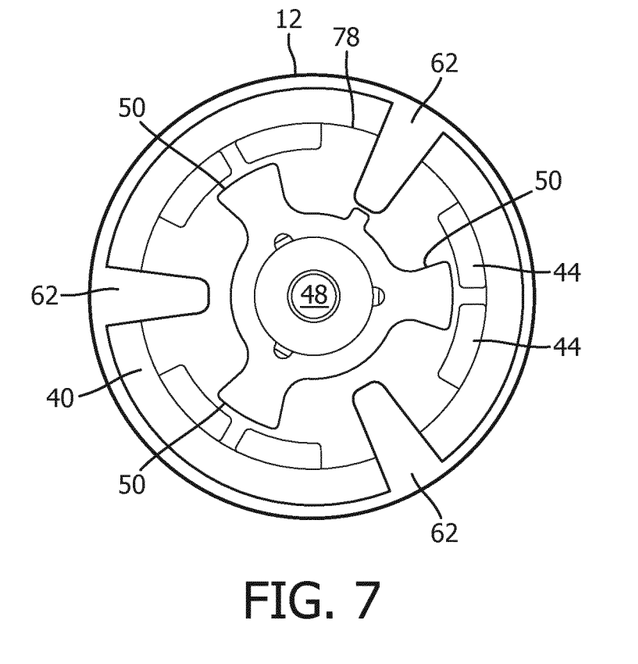
FIG. 7 is cross-section view of an electric motor and housing of a personal care cleaning device including a vibration cancelling suspension, in accordance with an embodiment.

In alternative embodiment, as shown in FIG. 7, a three-pole configuration may be used. In this configuration, stator 22 includes one set of windings and is positioned axially between the front and back poles. Furthermore, this configuration only requires three sets of North-South magnet pairs 44 reducing the total number of magnets to twelve. As magnets are grouped into North-South pairs, this arrangement provides additional space along the interior surface 78 of can 40. As shown, the second plurality of leaf spring elements 62 may extend through the exposed portions of the interior surface 78 of can 40, between adjacent pairs of magnets 44.

Figure 8:
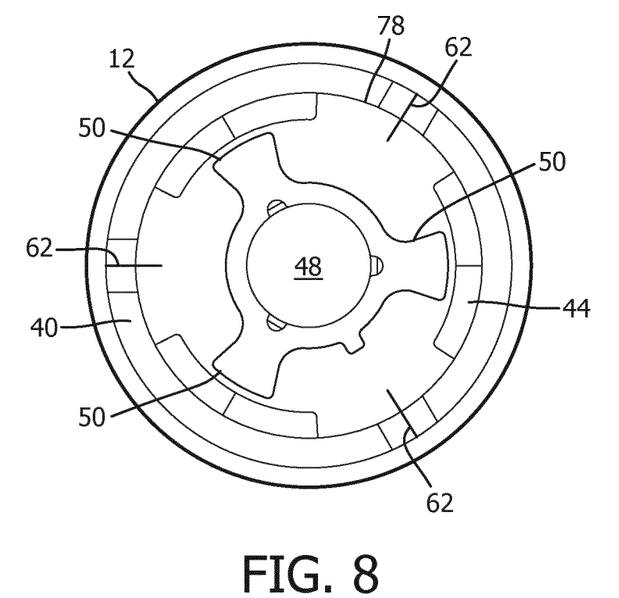
FIG. 8 is cross-section view of an electric motor and housing of a personal care cleaning device including a vibration cancelling suspension, in accordance with an embodiment.

In another embodiment, as shown in FIG. 8, each magnetic North-South pair may be combined into a single magnet 44 with a N-S magnetization pattern, yielding additional space along the interior surface 78 of can 40 for the second plurality of leaf spring elements 62. This configuration further drops the number of magnets required to six magnets total—three N-S single magnets in the front and the three N-S single magnets in the rear of resonant drive actuator.

Figure 9:
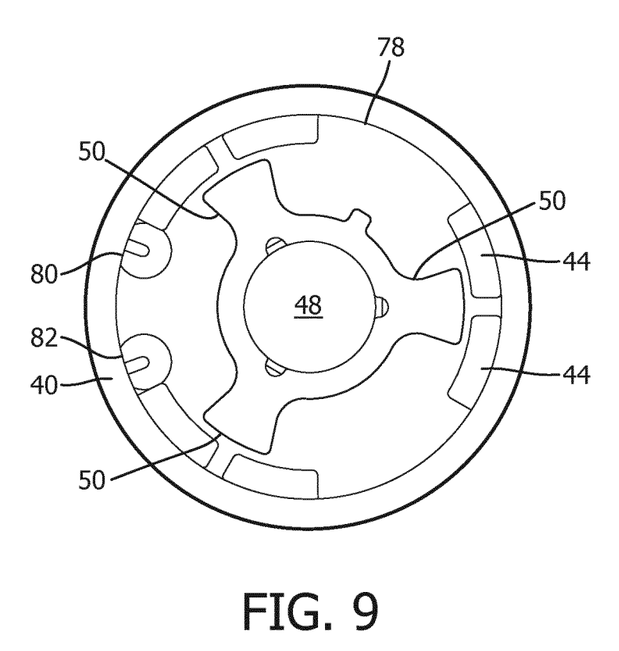
FIG. 9 is cross-section view of an electric motor of a personal care cleaning device, in accordance with an embodiment.

As shown in FIG. 9, the additional room allowed in a three-pole configuration also provides space for wire terminals 80, 82, which supply power to the windings 50 disposed about rotor 24, to extend axially along the interior of can 40, between adjacent groups of magnets 44.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A personal care cleaning device, comprising:
a housing dimensioned to be grasped be a user;
a can defining an interior surface;
a plurality of magnets disposed upon the interior surface of the can, wherein the plurality of magnets are grouped into a plurality of groups;
a resonant drive actuator, comprising:
a rotor having a first moment of inertia ($J_r$) and disposed within and extending through a stator, said stator having a second moment of inertia ($J_s$) and disposed within said housing;
a first plurality of leaf spring elements having a first spring constant ($k_{rh}$), each leaf spring element of the first plurality of leaf spring elements being connected to the housing and to the rotor such that each leaf spring element of the first plurality of leaf springs elements extends radially from the rotor to the housing and is configured to elastically deform to permit the rotor to rotate with respect to the housing; and
a second plurality of leaf spring elements having a second spring constant ($k_{sh}$), each leaf spring element of the second plurality of leaf spring elements being connected to the housing and to the stator, each leaf spring element extending axially along at least a portion of the length of the stator and being configured to elastically deform to permit the stator to rotate with respect to the housing, wherein each leaf spring leaf of the second plurality of leaf spring elements extends into the can through a portion of the interior surface between adjacent groups of the plurality of groups; and
wherein a ratio of the first ($k_{rh}$) and second ($k_{sh}$) spring constants is sufficiently similar to a ratio of the first ($J_r$) and second ($J_s$) moments of inertia such that there is substantially no resulting torque transmitted to the housing during operation.

2. The personal care cleaning device of claim 1, wherein a first portion of the rotor extends beyond a first end of the stator and a second portion of the rotor extends beyond a second end the stator, wherein a first set of the first plurality of leaf spring elements are connected to the rotor at a point along the first portion of the rotor.

3. The personal care cleaning device of claim 2, wherein a second set of the first plurality of leaf spring elements are connected to the rotor at a point along the second portion of the rotor.

4. The personal care cleaning device of claim 2, further comprising a ball bearing connecting the rotor to the housing, wherein the ball bearing engages with the rotor at a point along the second portion of the rotor and permits the rotor to rotate with respect to the housing.

5. The personal care cleaning device of claim 1, wherein, during operation, the rotor is configured to rotate with respect to the housing in a first angular direction, wherein the stator is configured to rotate with respect to the housing in a second angular direction, wherein the first angular direction is opposite the second angular direction.

6. The personal care cleaning device of claim 1, wherein each group of the plurality of magnets comprises a single magnet with a North-South magnetization pattern.

7. The personal care cleaning device of claim 1, wherein the housing defines a ring disposed circumferentially about the stator, wherein the first plurality of leaf spring elements are connected to the ring.

8. The personal care cleaning device of claim 1, further comprising a set of terminals configured to electrically engage with the rotor, wherein each terminal of the set of terminals extends axially along the interior of the can, between at least one pair of adjacent grouped magnets of the plurality of magnets.

9. The personal care cleaning device of claim 1, wherein the rotor comprises an iron shaft.

10. A vibration cancellation suspension, comprising:
a first plurality of leaf spring elements being connected to a rotor of a resonant drive actuator and to a housing, wherein the first plurality of leaf spring elements retain the rotor centrally within a stator and permit, through elastic deformation of the first plurality of leaf spring element, the rotor to rotate with respect to the housing; and a second plurality of leaf spring elements extending axially along at least a portion of the length of the stator wherein the second plurality of leaf spring elements connects to the housing and engages with the stator to permit, through elastic deformation of the second plurality of leaf spring elements, the stator to rotate with respect to the housing, wherein the first plurality of leaf spring elements and second plurality of leaf spring elements are configured to flexibly suspend the rotor and the stator with respect to the housing such that the rotor and the stator rotate in opposite angular directions, with respect to each other, during operation; and wherein the stator comprises a can defining an interior surface; and wherein each leaf spring of the second plurality of leaf spring elements extends into the can through a respective portion of an interior surface of the can between adjacent groups of magnets of a plurality of magnets.

11. The vibration cancellation suspension of claim 10, wherein a first portion of the rotor extends beyond a first end of the stator and a second portion of the rotor extends beyond a second end the stator, wherein a first set of the first plurality of leaf spring elements are connected to the rotor at a point along the first portion of the rotor.

12. The vibration cancellation suspension of claim 11, wherein a second set of the first plurality of leaf spring elements are connected to the rotor at a point along the second portion of the rotor.

13. The vibration cancellation suspension of claim 11, further comprising a ball bearing connecting the rotor to the housing, wherein the ball bearing engages with the rotor at a point along the second portion of the rotor and permits the rotor to rotate with respect to the housing.

* * * * *